US007184485B2

(12) United States Patent
Balakrishnan et al.

(10) Patent No.: US 7,184,485 B2
(45) Date of Patent: Feb. 27, 2007

(54) TIME-DOMAIN WINDOWING OF MULTI-BAND OFDM SYSTEM TO ENABLE SPECTRAL SCULPTING

(75) Inventors: Jaiganesh Balakrishnan, Karnataka (IN); Anuj Batra, Dallas, TX (US); Hirohisa Yamaguchi, Tsukuba (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/174,401

(22) Filed: Jul. 1, 2005

(65) Prior Publication Data

US 2006/0008017 A1 Jan. 12, 2006

Related U.S. Application Data

(60) Provisional application No. 60/592,300, filed on Jul. 28, 2004, provisional application No. 60/584,571, filed on Jul. 1, 2004.

(51) Int. Cl.
*H04K 1/10* (2006.01)

(52) U.S. Cl. .................. 375/260; 375/295; 375/219; 370/208

(58) Field of Classification Search ............. 375/260, 375/130, 132, 219, 295; 370/206, 344, 480, 370/208, 210, 203, 285, 260, 329; 455/502, 455/504, 525, 63.1, 67.16; 341/143, 61
See application file for complete search history.

(56) References Cited

U.S. PATENT DOCUMENTS 6,035,000 A * 3/2000 Bingham .................. 375/296
6,657,950 B1 * 12/2003 Jones et al. ................. 370/208
6,826,409 B2 * 11/2004 Kostic et al. ............... 455/501
6,876,319 B2 * 4/2005 Webster et al. ............ 341/143
6,937,623 B2 * 8/2005 Cioffi et al. ................ 370/522

(Continued)

OTHER PUBLICATIONS

Fir Filters, Windows; W.-S. Lu, University of Victoria, Victoria, British Columbia, Canada Wiley Encyclopedia of Electrical and Electronics Engineering; John Wiley & Sons, Inc. Article Online Posting Date: Dec. 27, 1999.*

(Continued)

*Primary Examiner*—Temesghen Ghebretinsae
(74) *Attorney, Agent, or Firm*—Steven A. Shaw; W. James Brady; Frederick J. Telecky, Jr.

(57) ABSTRACT

A method of wirelessly communicating is disclosed. The method comprises generating a plurality of tones for a wideband orthogonal frequency division multiplex symbol (310), the tones including a plurality of contiguous zero-valued tones, inverse Fourier transforming the tones to a plurality of time-domain samples (312), copying a plurality of the time-domain samples as a portion of a cyclic block (314), the cyclic block (314) contiguous with the time-domain samples (312), time-domain window filtering the time-domain samples (312) and the cyclic block (314) to form a portion of the wideband orthogonal frequency division multiplex symbol (310), wherein the time-domain window filter (350) is a function $\Phi(k)$ having the property that $\Phi(k)+\Phi(k+N_{\mathit{fft}})$ is about equal to a constant $\theta$ where $N_{\mathit{fft}}$ is the number of tones, and transmitting the wideband orthogonal frequency division multiplex symbol (310).

25 Claims, 6 Drawing Sheets

U.S. PATENT DOCUMENTS

2002/0105901 A1* 8/2002 Chini et al. .................. 370/206
2003/0090994 A1* 5/2003 Kakura ....................... 370/208
2004/0125740 A1* 7/2004 Gardner ...................... 370/208
2005/0009476 A1* 1/2005 Wu et al. .................... 455/101
2005/0036563 A1* 2/2005 Suzuki et al. ............... 375/260

OTHER PUBLICATIONS

W. S. Lu, "Fir Filters, Windows," Wiley Encyclopeida of Electrical and Electronics Engineering, Article Online Posting Date: Dec. 27, 1999, Sections 2.2.1 and 2.2.2.

* cited by examiner

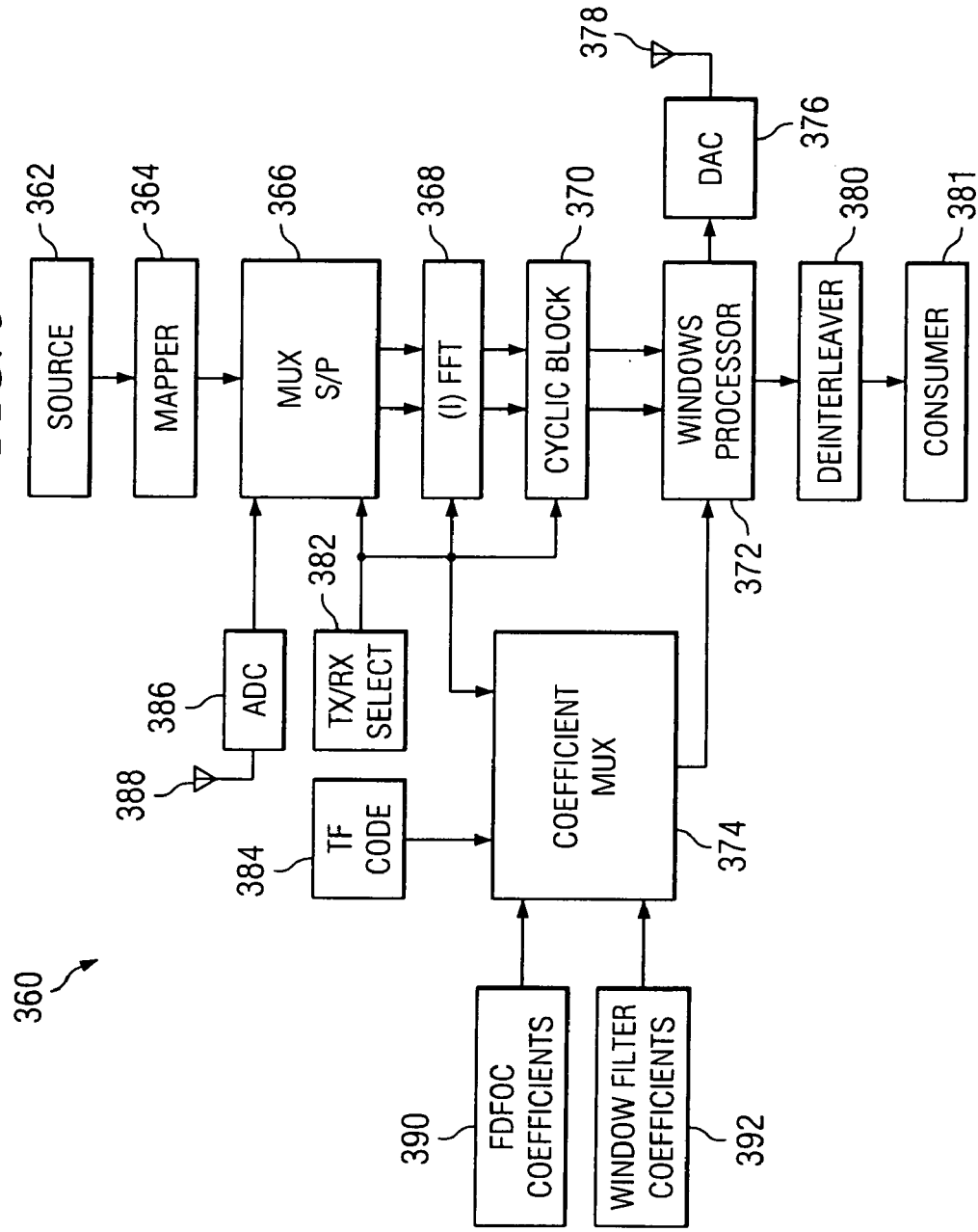

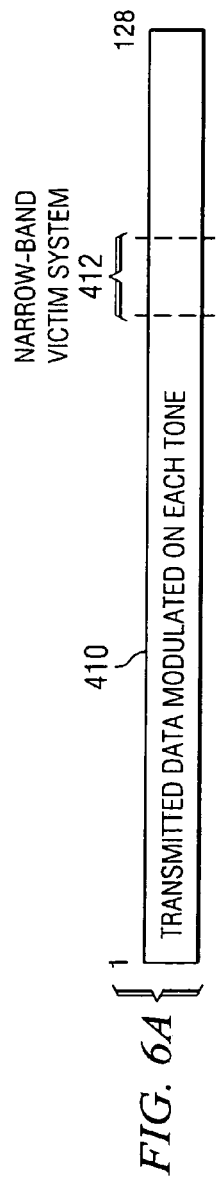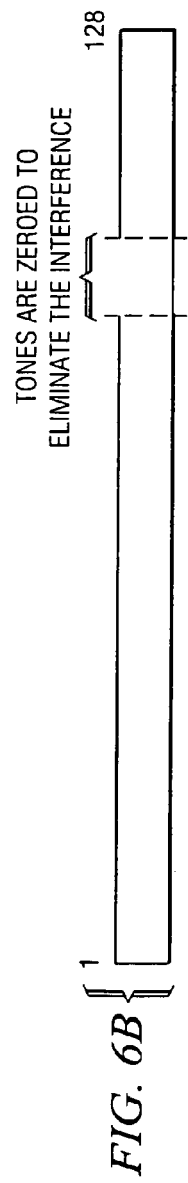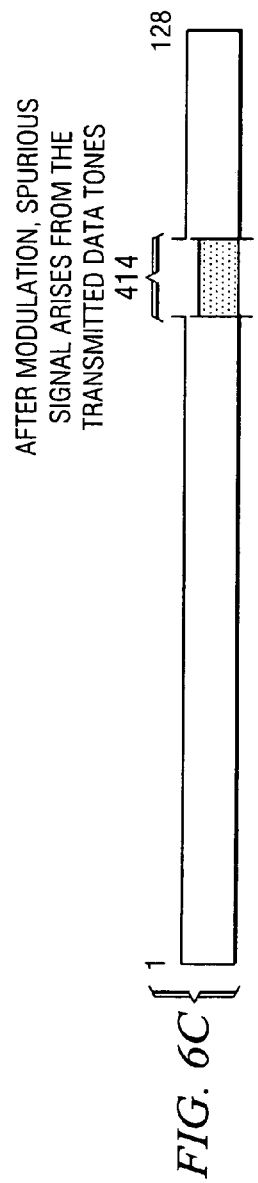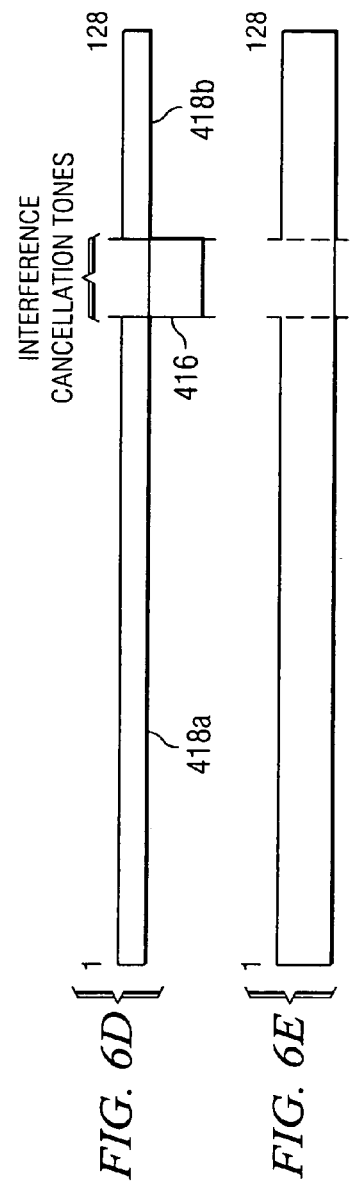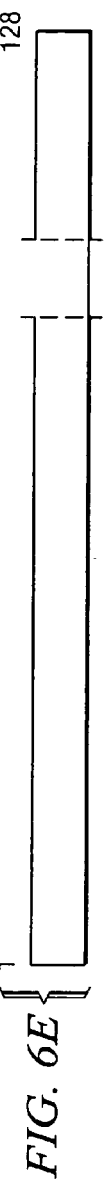

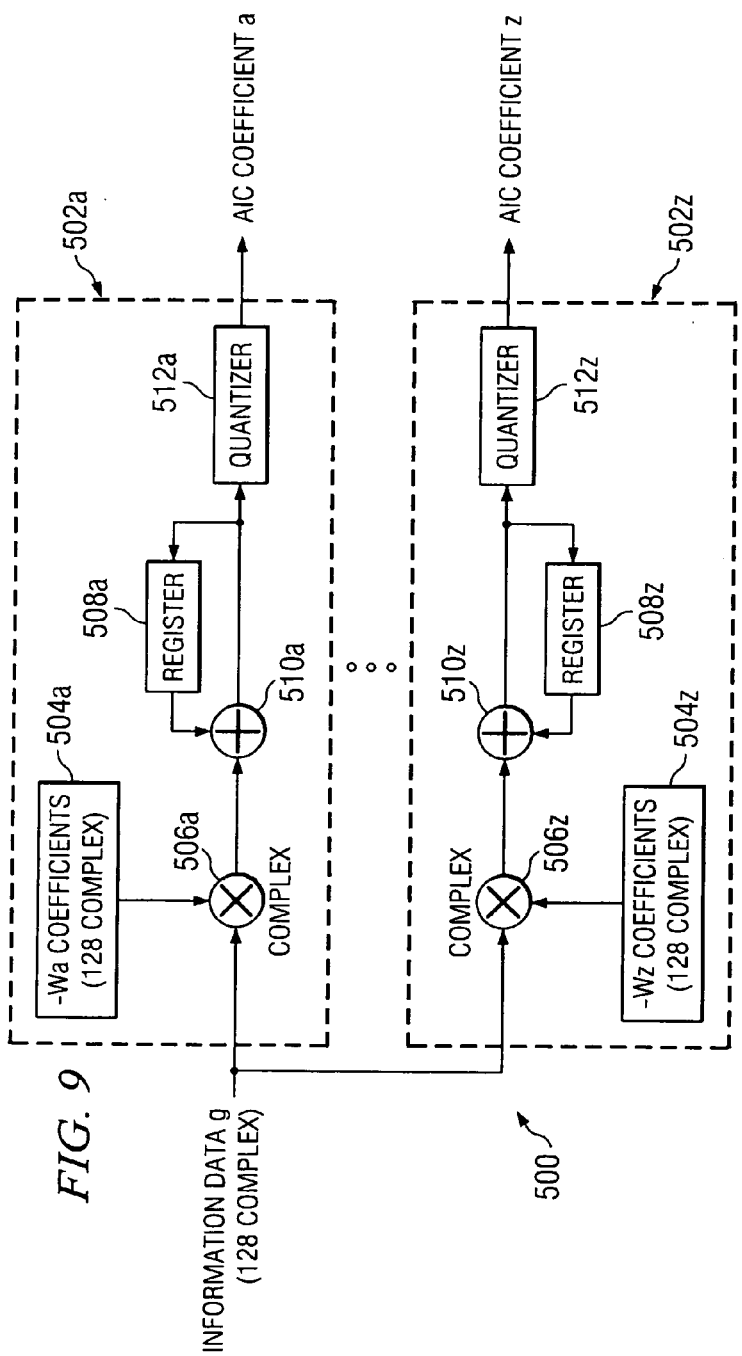

US 7,184,485 B2

TIME-DOMAIN WINDOWING OF MULTI-BAND OFDM SYSTEM TO ENABLE SPECTRAL SCULPTING

CROSS-REFERENCE TO RELATED APPLICATIONS

This application claims priority to U.S. Provisional Application No. 60/584,571, filed Jul. 1, 2004, entitled "Time-domain Windowing of Multi-band OFDM System to Enable Spectral Sculpting," by Jaiganesh Balakrishnan, et al, and to U.S. Provisional Application Ser. No. 60/592,300, filed Jul. 28, 2004, entitled "Dummy Tone Insertion for Enhanced Spectral Sculpting of the Multi-band OFDM Signal," by Jaiganesh Balakrishnan, both of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to wireless communications, and more particularly, but not by way of limitation, to a system and method for time-domain windowing of multi-band OFDM to enable spectral sculpting.

BACKGROUND OF THE INVENTION

A network provides for communication among members of the network. Wireless networks allow connectionless communications. Wireless local area networks are generally tailored for use by computers and may employ sophisticated protocols to promote communications. Wireless personal area networks with ranges of about 10 meters are poised for growth, and increasing engineering development effort is committed to developing protocols supporting wireless personal area networks.

With limited range, wireless personal area networks may have fewer members and require less power than wireless local area networks. The IEEE (Institute of Electrical and Electronics Engineers) is developing the IEEE 802.15.3a wireless personal area network standard. The term piconet refers to a wireless personal area network having an ad hoc topology comprising communicating devices. Communication among devices that are members of a piconet may be coordinated by a piconet coordinator (PNC). Piconets may form, reform, and abate spontaneously as various wireless devices enter and leave each other's proximity. Piconets may be characterized by their limited temporal and spatial extent. Physically adjacent wireless devices may group themselves into multiple piconets running simultaneously.

One proposal to the IEEE 802.15.3a task group divides the 7.5 GHz ultra wide band (UWB) bandwidth from 3.1 GHz to 10.6 GHz into fourteen bands, where each band is 528 MHz wide. These fourteen bands are organized into four band groups each having three 528 MHz bands and one band group of two 528 MHz bands. An example first device that is a member of a piconet, such as a transceiver, may transmit a first MB-OFDM symbol in a first 312.5 nS duration time interval in a first frequency band of a band group, a second MB-OFDM symbol in a second 312.5 nS duration time interval in a second frequency band of the band group, and a third MB-OFDM symbol in a third 312.5 nS duration time interval in a third frequency band of the band group. An example second device belonging to a different piconet may also transmit concurrently with the first device using the same band group, wherein the second device distinguishes its transmissions from those of the first device by using different time-frequency codes and a distinguishing preamble sequence. This method of members of different piconets sharing a band group by transmitting on each of the three 528 MHz wide frequencies of the band group may be referred to as time frequency coding or time frequency interleaving (TFI). Alternatively, members of one piconet may transmit exclusively on one frequency band of the band group while members of another piconet may transmit exclusively on another frequency band, which may be referred to as fixed frequency interleaving (FFI).

SUMMARY OF THE INVENTION

A method of wirelessly communicating is disclosed. The method comprises generating a plurality of tones for a wideband orthogonal frequency division multiplex symbol, the tones including a plurality of contiguous zero-valued tones, inverse Fourier transforming the tones to a plurality of time-domain samples, copying a plurality of the time-domain samples as a portion of a cyclic block, the cyclic block contiguous with the time-domain samples, time-domain window filtering the time-domain samples and the cyclic block to form a portion of the wideband orthogonal frequency division multiplex symbol, wherein the time-domain window filter is a function $\phi(k)$ having the property that $\phi(k)+\phi(k+N_{\mathit{fft}})$ is about equal to a constant $\theta$ where $N_{\mathit{fft}}$ is the number of tones, and transmitting the wideband orthogonal frequency division multiplex symbol.

A transmitter is disclosed. The transmitter comprises an inverse Fourier transformer operable to transform a frequency domain signal comprising a plurality of tones to a time-domain signal, the tones comprising in part a plurality of contiguous zero-valued tones and a windowing filter operable to filter the time-domain signal based on a windowing function, wherein the windowing function $\phi(k)$ has the property that $\phi(k)+\phi(k+N_{\mathit{fft}})$ is about equal to a constant $\theta$, where $N_{\mathit{fft}}$ is the number of tones, and wherein an output of the windowing filter comprises part of a multiband orthogonal frequency division multiplex symbol that is transmitted by the transmitter.

A transceiver is disclosed. The transceiver comprises a multiplex serial-to-parallel converter operable in a transmit mode to convert a $N_{\mathit{fft}}$ length sequence of bits into $N_{\mathit{fft}}$ parallel bits before transmitting as part of a multiband orthogonal frequency division multiplex symbol, the multiplex serial-to-parallel converter further operable in a receive mode to convert a $N_{\mathit{fft}}$ length sequence of data of at least part of a multiband orthogonal frequency division multiplex symbol into $N_{\mathit{fft}}$ parallel samples, a Fourier transformer operable in the transmit mode to inverse Fourier transform the $N_{\mathit{fft}}$ parallel bits in the frequency domain to $N_{\mathit{fft}}$ samples in the time domain, the Fourier transformer further operable in the receive mode to Fourier transform the $N_{\mathit{fft}}$ parallel samples in the time domain to $N_{\mathit{fft}}$ parallel bits in the frequency domain, and a windowing component operable in the transmit mode to process the $N_{\mathit{fft}}$ samples in the time domain using a windowing function, the windowing component further operable in the receive mode to process the $N_{\mathit{fft}}$ parallel bits in the frequency domain to provide fine frequency offset adjustment of the $N_{fft}$ parallel bits based on one or more pilot tones included among the $N_{fft}$ parallel bits in the frequency domain.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 5 is a block diagram of a transceiver according to an embodiment of the disclosure.

FIGS. 6A through 6E are illustrations of a plurality of orthogonal frequency division multiplex tones processed according to an embodiment of the disclosure. FIG. 6A illustrates an OFDM spectrum including interference tones. FIG. 6B illustrates an OFDM spectrum with interference tones turned off. FIG. 6C illustrates an OFDM spectrum containing spurious signals in the interference band. FIG. 6D illustrates an OFDM spectrum containing spurious signals from active interference cancellation tones. FIG. 6E illustrates resultant OFDM spectrum using active interference cancellation tones.

FIG. 9 is a block diagram of a circuit for determining protection-edge tones and active interference cancellation tones according to an embodiment of the disclosure.

FIG. 10 is a block diagram of a transmitter including the circuit for determining protection-edge tones and active interference cancellation tones according to an embodiment of the disclosure.

DETAILED DESCRIPTION OF THE PREFERRED EMBODIMENTS

Figure 4:
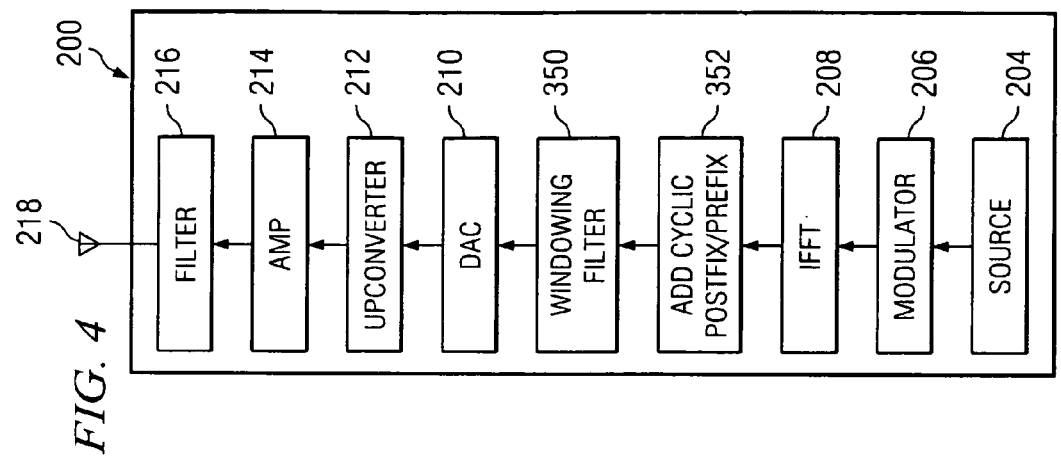
FIG. 4 is a block diagram of another transmitter according to an embodiment of the disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Ultra Wide-Band (UWB) technology based on multiband orthogonal frequency division multiplex (MB-OFDM) is being discussed as the industry standard for the near-distance high data-rate communication technology. Unlike the conventional licensed wireless services such as cellular phone, broadcast, satellite TV, radio astronomy, earth surveillance satellite, weather and airborne radar, which all may be referred to as conventional service bands, UWB radio is an unlicensed radio technology using 3.1 to 10.6 GHz bandwidth which overlays with the conventional service bands. In order to eliminate the possibility of interference to these incumbent conventional service bands, the revised Federal Communications Commission (FCC) rules limit the transmission power level of UWB to be below −41.25 dBm/MHz between 3.1 GHz and 10.6 GHz. Regarding this transmission power level, strong objection has been raised by the users of the bands protected by ITU-R Recommendation and regional Radio Law, for example the users of the Japanese radio astronomy bands from 3260 MHz to 3267 MHz, from 3332 MHz to 3339 MHz, from 3345.8 MHz to 3352.5 MHz, from 4825 MHz to 4835 MHz, from 4950 MHz to 4990 MHz, from 4990 MHz to 5000 MHz, and from 6650 MHz to 6675.2 MHz. In the remainder of the disclosure the case of MB-OFDM transmissions avoiding interference to a radio astronomy band that is 7 MHz wide, for example the 3260 MHz to 3267 MHz band, is discussed as a specific example, but it is readily apparent to one skilled in the art that the analysis and method described with respect to the exemplary radio astronomy band can be applied to other conventional service bands and using alternative OFDM technologies.

Elimination of the interference to a specific band is a problem in both bandwidth and attenuation level. For example, under the current Japan Radio Law, the general acceptable ambient radiation level is stipulated as −64.3 dBm/MHz. This is the peak signal power level, but it is known that in the 1 MHz bandwidth, the peak and average power levels are almost identical. Because the in-band (3.1–10.6 GHz) radiation of the UWB signal is limited to −41.3 dBm/MHz according to FCC R&O, one way for the UWB transmitter to coexist with the radio astronomy service is to lower the UWB interference to the ambient noise level. This would require an additional 23 dB or more attenuation of the transmitted MB-OFDM signal in the interference band.

In order to comply with the current and future requirement to protect specific bands, which may be referred to as victim bands or victim frequency bands, a number of approaches are possible. One approach is to notch out the specific bands from the MB-OFDM transmission using narrow-band radio frequency (RF) filters. However, the design of narrow-band RF notch filters is, in general, a challenging problem, and achieving desirable filter attenuation may involve significant chip cost or bill of material. Additionally, the notch frequency, the center of the narrow-band RF filter, may need to be adjustable according to the regional (e.g. Europe and Japan) spectrum usage.

Another approach, one that is particularly suited to OFDM, is to turn off the transmission of the OFDM sub-carriers or tones located in the interference band. OFDM communicates information bits as a collection of modulated narrow-band tones using the Fast Fourier Transform. In MB-OFDM, each tone occupies the bandwidth of about 4.125 MHz. Hence, for example, to prevent interference to the radio astronomy bandwidth of 7 MHz, two or three tones located in the band are turned off (zero values are assigned to these tones). This approach is potentially much more flexible because the narrow-band notch filtering is realized by digital signal processing and is more attractive from the chip implementation and cost point of view. A question arises whether the second approach, simply turning off interference tones, can adequately suppress the interference.

To provide the 23 dB attenuation required to avoid interfering with the Japanese radio astronomy band by turning off tones, many tones may need to be turned off, which may be considered excessive waste of the spectrum or an excessive sacrifice of bandwidth that reduces the communication throughput. Tones that are turned off may be referred to as null tones. Other tones in addition to the tones in the interference band need to be turned off to counteract interference in the subject interference band from other tones, perhaps located some spectral distance from the interference band. In an embodiment, a smaller number of null tones may be used in combination with a time-domain windowing filter to collectively obtain the desirable 23 dB attenuation without sacrificing as much bandwidth. Alternatively, a smaller number of tones may be employed, called dummy tones or active interference cancellation (AIC) tones, to achieve the desired attenuation in the interference band. The values of the AIC tones are determined, solving an optimization problem discussed below, to cancel the interference from other tones outside the interference band, which may be referred to as the AIC solution. In different operating environments, one or the other or a combination of these two solutions may be preferred.

The several solutions described herein after may, in one or more embodiments, be used to avoid interference to one or more of a Japanese radio astronomy band, a satellite band, a WiMax band, a fixed wireless access band, a fixed services band, and a fourth generation wireless band.

Figure 1:
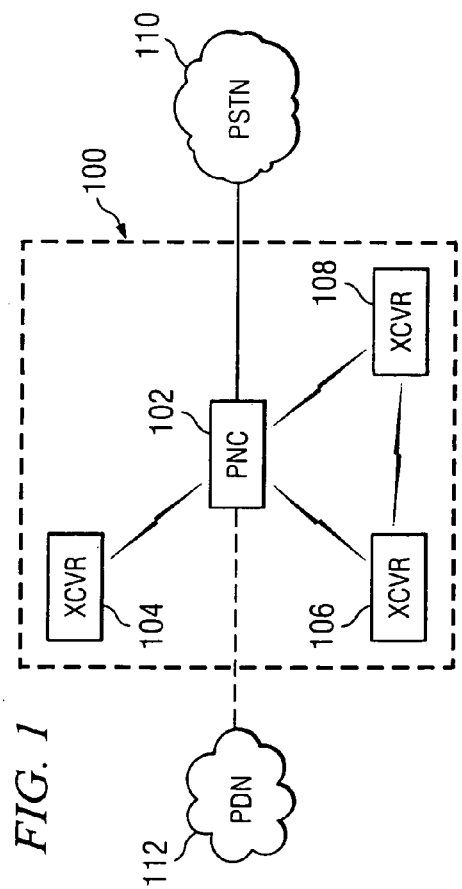
FIG. 1 is a diagram of a wireless piconet according to an embodiment of the disclosure.

Turning now to FIG. 1, a block diagram depicts a piconet 100 formed by a number of cooperating electronic devices, where the piconet 100 is suitable for practicing one or more embodiments of the present disclosure. A first transceiver 102 operates as the piconet controller for the piconet 100. A second transceiver 104, a third transceiver 106, and a fourth transceiver 108 operate as member of the piconet 100. The transceivers 102, 104, 106, and/or 108 may also be capable of operating as the piconet controller of the piconet 100, but are not depicted as carrying out that role. The first transceiver 102 may broadcast beacon messages, which may be referred to simply as beacons, to promote communication among the members of the piconet 100. The effective range of the beacon messages, and hence the effective boundary of the piconet 100, is depicted by a dashed line in FIG. 1.

The first transceiver 102 may be connected to either a public switched telephone network 110 or to a public switched data network 112 whereby the members of the piconet 100, for example the transceivers 102, 104, 106, and 108, may communicate with the Internet or other network of interconnected communication devices. The transceivers 102, 104, 106, and 108 may wirelessly communicate according to the Multi-band orthogonal frequency division multiplex (OFDM) Alliance (MBOA) Special Interest Group (SIG) Physical layer specification, according to a WiMedia wireless personal area network protocol, and/or according to an Ecma wireless personal area network protocol. The wireless communications among members of the piconet 100 are transmitted and received as a sequence of OFDM symbols. While the description above focuses on a wireless multi-band OFDM system, one skilled in the art will readily appreciate that the dual block size block coding concept may be applied to other OFDM systems. Further, the transceivers 102, 104, 106, and 108 may be operable for implementing the present disclosure.

Figure 2:
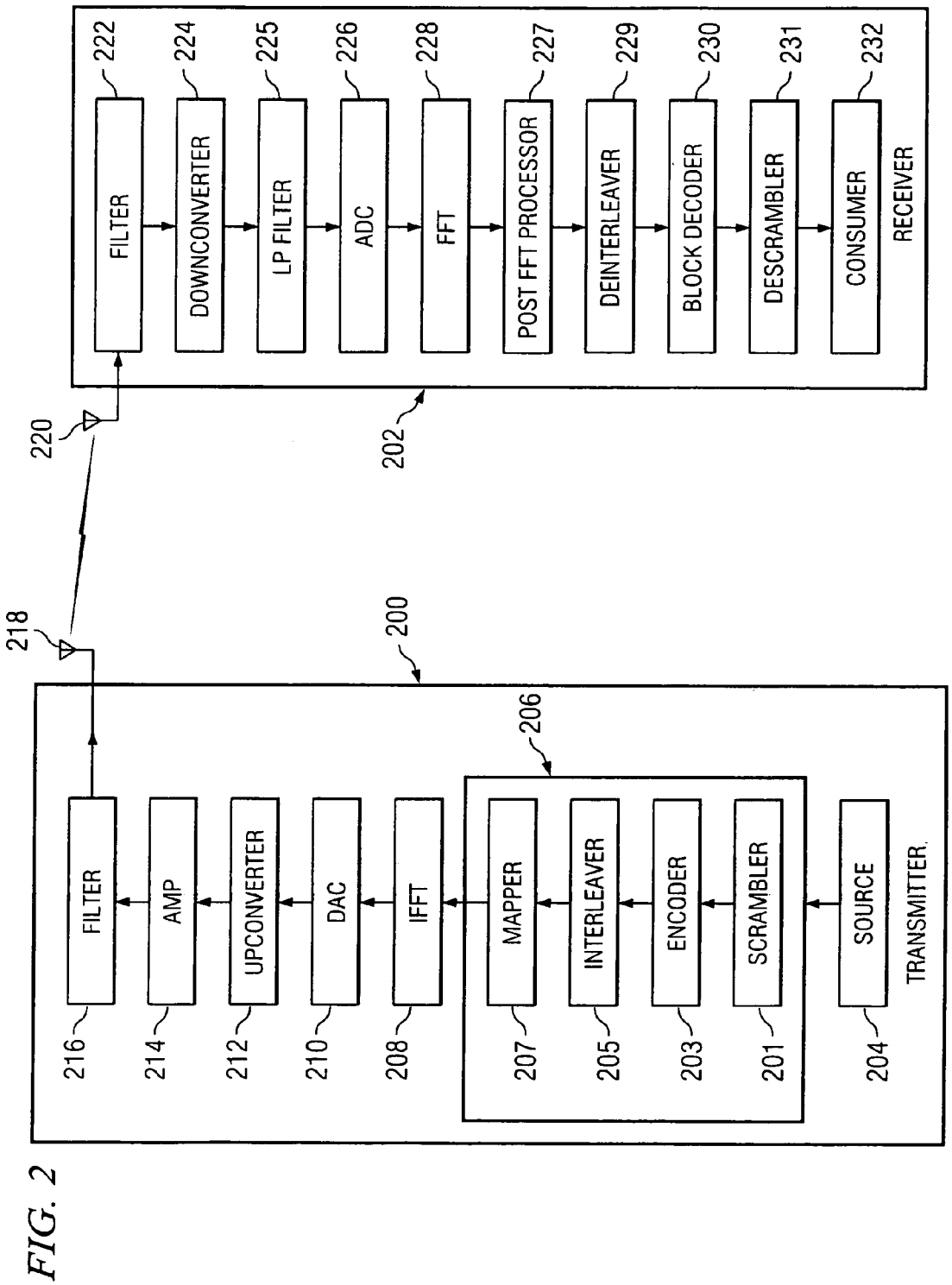
FIG. 2 is a block diagram of a transmitter in communication with a receiver according to an embodiment of the disclosure.

Turning now to FIG. 2, an exemplary wireless transmitter 200 is shown in communication with an exemplary wireless receiver 202, the wireless transmitter 200 and the wireless receiver 202 being suitable to practicing one or more embodiments of the present disclosure. Some conventional elements of transmitters and receivers may be omitted from FIG. 2 but will be readily apparent to one skilled in the art. The wireless transmitter 200 is suitable for transmitting OFDM symbols formatted according to embodiments of the present disclosure, and the wireless receiver 202 is suitable for receiving the OFDM symbols formatted according to embodiments of the present disclosure. A signal source 204 provides data to be transmitted to a modulator 206. The modulator 206 may comprise a spreader or scrambler component 201, a block encoder 203, an interleaver 205, and a mapper 207. The scrambler component 201 processes the data, which may be referred to as a bit stream, and provides input information data to the block encoder 203.

The block encoder 203 encodes the input information data into output information data in a first block size for a first portion of the message and a second block size for a second portion of the message. Reed-Solomon, low density parity check, or other block coding mechanism or component may be employed to block encode the information data. An interleaver 205 may further process the bit stream. The output of the interleaver 205 is provided to a mapper 207 that mounts the output of the interleaver onto quadrature amplitude modulation (QAM) constellations for each of the tones. The mapper 207 may introduce null tones to attenuate interference in the subject interference band, for example the 3260 MHz to 3267 MHz radio astronomy band. In an embodiment, a number of from about seven to about fifteen tones may be assigned zero values or generated as null tones. In an embodiment, about eleven null tones may be employed. In another embodiment, however, a different number of null tones may be employed, for example to notch filter to protect a bandwidth different from the exemplary 7 MHz bandwidth discussed above. The modulator 206 provides the tones to an inverse fast Fourier transformer component 208 which translates the frequency domain representation of the data into a time domain representation of the same data.

The inverse fast Fourier transformer component 208 provides the time domain representation of the signal to a digital-to-analog converter 210 which converts the digital representation of the signal to an analog form. The analog form of the signal is a 528 MHz wide baseband signal. The digital-to-analog converter 210 provides the 528 MHz wide baseband signal to an up converter 212 which frequency shifts the 528 MHz wide baseband signal to the appropriate frequency band for transmission. The up converter 212 provides the up converted 528 MHz wide signal to an amplifier 214 which boosts the signal strength for wireless transmission. The amplifier 214 feeds the up converted, amplified, 528 MHz wide signal to a band-select filter 216, typically having a bandwidth of 1584 MHz, that attenuates any spurious frequency content of the up converted signal which lies outside the desirable three bands of the MB-OFDM signal. The band-select filter 216 feeds a transmitting antenna 218 which wirelessly transmits the up converted, amplified, band-select filtered 528 MHz wide signal.

The wireless signal is received by a receiving antenna 220. The receiving antenna 220 feeds the signal to a receiving band-select filter 222, typically having a bandwidth of 1584 MHz, that selects all three bands of the MB-OFDM signal from the entire bandwidth which the receiving antenna 220 is capable of receiving. The receiving band-select filter 222 feeds the selected MB-OFDM signal to a down converter 224 which frequency shifts the MB-OFDM signal to a 528 MHz baseband signal. The down converter 224 feeds the 528 MHz baseband signal to a base-band, low-pass filter 225, typically having a 528 MHz bandwidth. The base-band, low-pass filter 225 feeds the filtered 528 MHz baseband signal to an analog to digital converter 226 which digitizes the filtered 528 MHz baseband signal. The analog to digital converter 226 feeds the digitized 528 MHz baseband signal to a fast Fourier transformer 228 which converts the digitized 528 MHz baseband signal from the time domain to the frequency domain, decomposing the digitized 528 MHz baseband signal into distinct frequency domain tones.

The fast Fourier transformer 228 feeds the frequency domain tones to a post FFT processing block 227 that performs frequency domain equalization to compensate for the multi-path channel, phase tracking and correction and also the demapping. The post-FFT processing block 227 may perform fine frequency offset correction. The post FFT processing block 227 output feeds to a deinterleaver 229 that reverses the processing performed in the transmitter 200 by the interleaver 205. The deinterleaver 229 output feeds to a decoder component 230 that extracts the data from the blocks. The decoder component 230 output feeds to a descrambler component 231 which reverses the processing performed in the transmitter 200 by the scrambler component 201. The stream of data is then provided to a media access control (MAC) component 232 which interprets and uses the stream of data.

The wireless transmitter 200 and wireless receiver 202 structures described above may be combined in some embodiments in a single device referred to as a transceiver, for example the transceivers 102, 104, 106, and 108 described above with reference to FIG. 1. While the transmitting bandpass filter 216 and the amplifier 214 are described as separate components, in some embodiments these functions may be integrated in a single component. Additionally, in some embodiments the up converted 528 MHz bandwidth signal may be bandpass filtered by the transmitting bandpass filter 216 before it is amplified by the amplifier 214. Other systems, components, and techniques may be implemented for these purposes which will readily suggest themselves to one skilled in the art and are all within the spirit and scope of the present disclosure.

Figure 3:
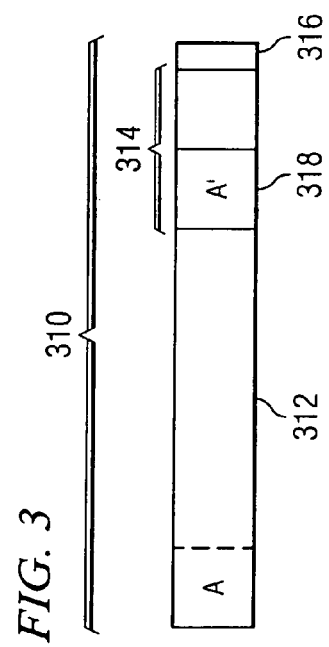
FIG. 3 is a block diagram of a time domain multi-band orthogonal frequency division multiplex (MB-OFDM) symbol according to an embodiment of the disclosure.

Turning to FIG. 3, a MB-OFDM symbol 310 is depicted in the time domain that is suitable for use in one or more embodiments of the present disclosure. The MB-OFDM symbol 310 may comprise one hundred and sixty-five samples including a data block 312 comprising one hundred and twenty-eight samples, a cyclic block 314 comprising thirty-two samples, and a guard block 316 containing five samples.

The data block 312 contains samples representing the content of the information to be transmitted by the transmitter 200 in the MB-OFDM symbol 310. The guard block 316 contains zero values and provides a guard interval during which the transmitter 200 and the receiver 202 may switch from a first MB-OFDM frequency band to a second MB-OFDM frequency band, for example when communicating in time frequency interleaving mode. The cyclic block 314, which may be referred to as a cyclic postfix, includes a copied samples block 318 that contains samples that are copied from the front of the data block 312. The original data samples are represented by A and the copied data samples are represented by A' in FIG. 3.

In an embodiment, the number of copied data samples is in the range from about eight to about twenty-four samples. In an embodiment, the number of copied data samples is sixteen. In other embodiments, however, a different number of copied data samples may be employed. In another embodiment, the MB-OFDM symbol 310 may comprise a different number of samples and a different number of samples may be copied. In another embodiment, samples may be copied from the end of the data block 312 and copied into a cyclic prefix in-front of the data block 312. In another embodiment, a combination of cyclic prefix and cyclic postfix may be employed.

Adding a cyclic prefix to the time-domain OFDM signal prior to applying the windowing function may introduce processing latency. Typical IFFT implementations may output the time-domain OFDM symbol in a serial fashion and a cyclic prefix may be added only after all the $N_{fft}$ samples of the OFDM symbol are available. The first sample of the cyclic prefix may be output only after the IFFT provides the $N_{fft}$-$Lp^{th}$ sample of the MB-OFDM symbol 310, where Lp is the length of the cyclic prefix. This introduces a minimum latency of $N_{fft}$-Lp at the transmitter. To avoid this latency, the output OFDM symbol can be cyclically shifted by Lp samples by the operation of multiplying the frequency domain signal, prior to IFFT, by a linear phase as a function of $L_p$. Note that a cyclic shift in the time domain is equivalent to a linear phase multiplication in the frequency domain. This linear phase multiplication operation is represented mathematically as $$X_{cyc}(k) = X(k)\exp\left(\frac{j2\pi k L_p}{N}\right)$$

The IFFT operation is now performed on the sequence $X_{cyc}(k)$ instead of $X(k)$. The sequence $X_{cyc}(k)$ may be referred to as the linearly phase compensated tones. Once we obtain the time-domain OFDM sequence $x_{cyc}(n)$, we have to copy the first Lp samples to the end of the cyclically shifted symbol. Hence, any latency due to adding a cyclic prefix can be overcome.

Turning now to FIG. 4, another embodiment of the transmitter 200 is depicted. The transmitter 200 may further include a windowing component 350 and a cyclic component 352. The cyclic component 352 is operable to append the copied samples.cyclic block 314, including the copied samples block 318, to the data samples 312. In an embodiment, zero valued tones, also referred to as null tones, are used to provide partial protection of victim frequencies, for example a 7 MHz bandwidth radio astronomy band, and the windowing filter 350 is operable to provide additional attenuation to protect the victim frequencies. When a windowing function $\Phi(k)$ is employed by the windowing filter 350, where $\Phi(k)$ has the property $$\Phi(k)+\Phi(k+N_{fft})\approx\theta \qquad \text{Eq(1)}$$

where $\theta$ is a constant and the relationship is approximate equality, the cyclic convolution property of the multi-path channel is preserved, and this condition makes it possible for the receiver 202 to receive the transmission without prior knowledge of the special processing employed by the transmitter 200 to protect the victim frequencies. Two exemplary windowing functions $\Phi(k)$ are defined below in equations Eq (2) and Eq (3), but other windowing filter functions that maintain the cyclic convolution property of the multi-path channel that are known to those skilled in the art are also contemplated by the present disclosure.

In an embodiment, a raised-cosine function may be employed by the windowing filter 350. The raised-cosine function Φ(k) may be defined as:

$$\Phi(k) = 1 \Big/ 2\left[1 + \cos\left(\frac{\pi(2L_p - 2k - 1)}{2L_p}\right)\right] \text{ for } k = 0, \ldots, L_p - 1 \quad \text{Eq (2)}$$

$$\Phi(k) = 1 \text{ for } k = L_p, \ldots, N_{\mathit{fft}} - 1$$

$$\Phi(k) = 1 \Big/ 2\left[1 + \cos\left(\frac{\pi(2k - 2N_{\mathit{fft}} + 1)}{2L_p}\right)\right] \text{ for } k = N_{\mathit{fft}},$$

$$\ldots, N_{\mathit{fft}} + L_p - 1$$

$$\Phi(k) = 0 \text{ for } k < 0 \text{ and } k > N_{\mathit{fft}} + L_p - 1$$

where $L_p$ is the number of samples contained by the copied samples block 18 and $N_{\mathit{fft}}$ is the number of samples contained by the data block 312.

In another embodiment, a trapezoidal function may be employed by the windowing filter 350. The trapezoidal function Φ(k) may be defined as:

$$\Phi(k) = \frac{2k + 1}{2L_p} \text{ for } k = 0, \ldots, L_p - 1 \quad \text{Eq (3)}$$

$$\Phi(k) = 1 \text{ for } k = L_p, \ldots, N_{\mathit{fft}} - 1$$

$$\Phi(k) = \frac{2N_{\mathit{fft}} + 2L_p - 2k - 1}{2L_p} \text{ for } k = N_{\mathit{fft}},$$

$$\ldots, N_{\mathit{fft}} + L_p - 1$$

$$\Phi(k) = 0 \text{ for } k < 0 \text{ and } K > N_{\mathit{fft}} + L_p - 1$$

where $L_p$ is the number of samples contained by the copied samples block 18 and $N_{\mathit{fft}}$ is the number of samples contained by the data block 312.

Turning now to FIG. 5, a transceiver 360 is depicted that provides the functions of the windowing filter 350 described above while also providing circuit elements that are shared by the transmitter and receiver sections of the transceiver 360. Some conventional components of the transceiver 360 are not shown in FIG. 5 to make the drawing more concise and to focus the drawing on the shared circuit elements. The transceiver 360 comprises a source 362, a mapper component 364, a serial-to-parallel multiplexer 366, a Fourier transformer component 368, a cyclic block component 370, a window processor component 372, a coefficient multiplexer 374, a DAC 376, a transmit antenna 378, a deinterleaver component 380, a consumer process 381, a transmit/receive select control 382, a time frequency code select 384, an ADC 386, and a receive antenna 388. In an embodiment, the transmit antenna 378 and the receive antenna 388 may be combined as a single antenna. The source 362, the mapper component 364, the DAC 376, the deinterleaver 380, the consumer 381, and the ADC 386 are substantially similar to the corresponding elements depicted in FIG. 2.

The transmit/receive select control 382 selects a transmit mode or a receive mode of operation for the serial-to-parallel multiplexer 366, the Fourier transformer component 368, the cyclic block 370, and the coefficient multiplexer 374. The time frequency code select 384 selects the coefficient multiplexer 374 for operation in accordance with one of multiple MB-OFDM frequency bands.

In transmit mode, the source 362 provides data to be transmitted to the mapper component 364. The mapper component 364 mounts the data onto QAM constellations for all of the tones. Some of the tones associated with a victim frequency band may be set to zero or produced as null tones. The serial-to-parallel multiplexer 366 converts the output of the mapper component 364 to a number $N_{\mathit{fft}}$ parallel values, where $N_{\mathit{fft}}$ is the number of samples in the data block 312. In an embodiment, the value of $N_{\mathit{fft}}$ is 128, but one skilled in the art will appreciate that this solution can be readily extended to other MB-OFDM symbol formats in which a different number $N_{\mathit{fft}}$ of parallel values is output by the serial-to-parallel multiplexer 366. The Fourier transformer component 386, when selected for transmit operation mode, transforms the $N_{\mathit{fft}}$ parallel values output by the serial-to-parallel multiplexer 366 from the frequency domain to the time domain as $N_{\mathit{fft}}$ parallel samples.

The cyclic block 370 adds the cyclic block 314 to form N parallel samples, including the copied samples, as discussed with respect to FIG. 3 above. In an embodiment, the value of N is 160, but other MB-OFDM symbol formats having a different number of data samples and cyclic block samples are contemplated by the present disclosure. The window processor 372, when selected for transmit operation mode, performs a window filtering operation on the N parallel samples output by the cyclic block 314 based on the coefficients provided by the coefficient multiplexer 374. The coefficient multiplexer 374 outputs N window filter coefficients 392 based on the time frequency code select 384. The window filter coefficients 392 are generated in accordance with the windowing function Φ(k) as discussed above. In an embodiment, the window filter coefficients 392 are stored in a memory or a cache for access by the coefficient multiplexer 374. The DAC 375 converts the samples output by the window processor 372 from digital values to analog values which are then transmitted by the first antenna 378. In one embodiment, the time-domain window filtering is employed to form every third wideband orthogonal frequency division multiplex symbol of a stream of wideband orthogonal frequency division multiplex symbols.

In receive mode, a signal is received by the receive antenna 388 and converted from an analog to digital value by the ADC 386. The digital values from the ADC 386 are converted by the serial-to-parallel multiplexer 366 to a plurality of parallel samples. The Fourier transformer component 368, when selected for receive operation, transforms the parallel samples output by the serial-to-parallel multiplexer 366 from the time domain to the frequency domain. In the receive operation, the frequency domain samples pass through or around the cyclic block 370 without being processed. The window processor 372 performs a fine frequency offset correction of the frequency domain samples based on a plurality of FDFOC coefficients 390 provided by the coefficient multiplexer 374. The deinterleaver 380 processes the output of the window processor 372 and passes the time domain samples on to the consumer 381 such as a MAC component that interprets and uses the data. The shared circuitry of the Fourier transformer 368 and the window processor 372 may provide for efficient circuit implementation of the transceiver 360, for example in reducing the number of circuit elements of a system-on-chip implementation.

As suggested above when discussing the use of null tones alone, a smaller number of tones may be employed, called dummy tones or active interference cancellation (AIC) tones, to obtain the desirable 23 dB attenuation without sacrificing as much bandwidth. The values of the AIC tones are determined, solving an optimization problem discussed below, to cancel the interference from other tones outside the interference band, which may be referred to as the AIC solution. This application includes subject matter related to U.S. patent application Ser. No. 11/173,840, filed Jul. 1, 2005, entitled "Ultra Wideband Interference Cancellation for Orthogonal Frequency Division Multiplex Transmitters by Protection-Edge Tones," by Jaiganesh Balakrishnan, et al, which is hereby incorporated herein by reference for all purposes.

In UWB, the average transmit power is limited to −41.25 dBm/MHz in-between 3.1 and 10.6 GHz, and the maximum transmit power of any UWB device must not exceed this limit in order to prevent an excessive interference to the existing radio systems. It has been found that solving the optimization problem discussed below considering only the attenuation of interference from other tones outside the interference band creates the desired notch depth and the bandwidth but the solution is accompanied by an overshoot of the value of the interference cancellation tones at the edges of the notch band. Due to this overshoot, the transmit power of the UWB device would need be lowered, resulting in a performance degradation. The present disclosure solves the optimization problem based on two conditions—based on attenuating the signal in the interference band and also based on keeping the value of the AIC tones at or below the power level of the remaining non-AIC tones.

A solution, which may be referred to as the power constrained AIC solution, combines AIC tones with a group of tones called protection-edge tones (PET), and solves the optimization problem with the additional constraint that the maximum average power of the resulting AIC tones and PETs does not exceed the −41.25 dBm/MHz limit. The AIC tones and PETs are determined by multiplying the transmitted OFDM data tones with a set of pre-computed coefficients that are a function of the bandwidth and frequency position of the notch. In the power constrained AIC solution, the depth of the notch is adjustable by the number of the PETs, wherein both the bandwidth and depth of the notch may be arbitrary determined without an overshoot. In some cases, the term AIC tones may be used to mean both the AIC tones and the PETs.

Turning now to FIGS. 6A through 6E, the basic concept of AIC is illustrated. With reference now to FIG. 6A, in the MB-OFDM system, the information data is transmitted using 128 tones. A plurality of data 410 is illustrated without employing AIC tones. When the data 410 is modulated in OFDM and transmitted, the MB-OFDM system causes some interference to a victim system in an interference band 412 associated with some of the OFDM tones. With reference to FIG. 6B, turning off the tones within the interference band 412 reduces the direct interference to the victim band somewhat. With reference to FIG. 6C, turning off the tones within the interference band 412 does not guarantee the complete elimination of the interference, because it reduces the interference to zero only at the tone center frequencies. What still remains in-between the zeroed tones is the spurious interference signal 414 from residuals of all the rest of the transmitted data tones. The spurious signal in the interfering band can be computed from the transmitted data located outside the interfering band, shown in FIG. 6B. A negative of the spurious signal 416 can then be calculated, as shown in FIG. 6D, and used to cancel the spurious signal 414 with results as shown in FIG. 6E. The negative of the spurious signal 416 may be referred to as the AIC tones.

One point to note is that the AIC tones transmit non-zero power and this causes interference 418a and 418b back to the original data tones, as shown in FIG. 6D. However, in OFDM, it is known that such interference does not fall into the actual data as long as the frequency synchronization is achieved between the transmitter 200 and receiver 202. Because such technique is well established today, it is considered that the interference from the non-zero tones within the interfering band is insignificant.

In OFDM, the information data is modulated on each tone and the resulting set of tones are inverse Fourier transformed (and low-pass filtered) as a vector. At the receiver, the received signal is Fourier transformed in order to recover the original data vector. In the general OFDM system, the IFFT and FFT pair is synchronized and data is mapped on the regular discrete frequencies (multiple times of the tone interval frequency, for example 4.125 MHz). Thus it is only necessary to compute the signal spectrum at the tone center frequencies. On the other hand, the interference to the victim systems occurs at frequencies in-between the tone frequencies. It is therefore preferable to compute the spectrum of the transmitted OFDM signal on a finer frequency grid. Up-sampling by two may not adequately capture the interference in-between the tones, and up-sampling by 8 or larger may result in an excessive computational load in some embodiments. In an embodiment, up-sampling by four is employed and is the basis of the analysis and examples that follow, but other embodiments that up-sample at other rates are also contemplated by the present disclosure.

In the following analysis, the OFDM symbol of 128 tones is analyzed. One skilled in the art will readily appreciate, however, that the analysis and solutions discussed may be applied to other OFDM symbol structures. When the information data is represented as X(k) k=0, . . . , 127, the transmitted OFDM signal is (without low-pass filter)

$$x(n) = \sum_{k=0}^{127} X(k)\exp\left(j2\pi\frac{nk}{128}\right) \qquad \text{Eq (4)}$$

and the corresponding (four-time up-sampled) spectrum Y(l) (l=0, . . . 4*128−1) is $$Y(l) = \frac{1}{128}\sum_{n=0}^{127} x(n)\exp\left(-j2\pi\frac{n}{128}\frac{l}{4}\right) \qquad \text{Eq (5)}$$

Combining these two equations, the relation between X and Y may be represented $$Y(l) = \frac{1}{128}\sum_{n=0}^{127}\left(\sum_{k=0}^{127} X(k)\exp\left(j2\pi\frac{n}{128}\left(k-\frac{1}{4}\right)\right)\right) \qquad \text{Eq (6a)}$$

$$= \frac{1}{128}\sum_{k=0}^{127} X(k)P(l, k)$$

$$P(l, k) = \sum_{n=0}^{127} e^{j2\pi n(k-l/4)/128} \qquad \text{Eq (6b)}$$

where P(l,k) is the kernel of the transform.

Figure 7:
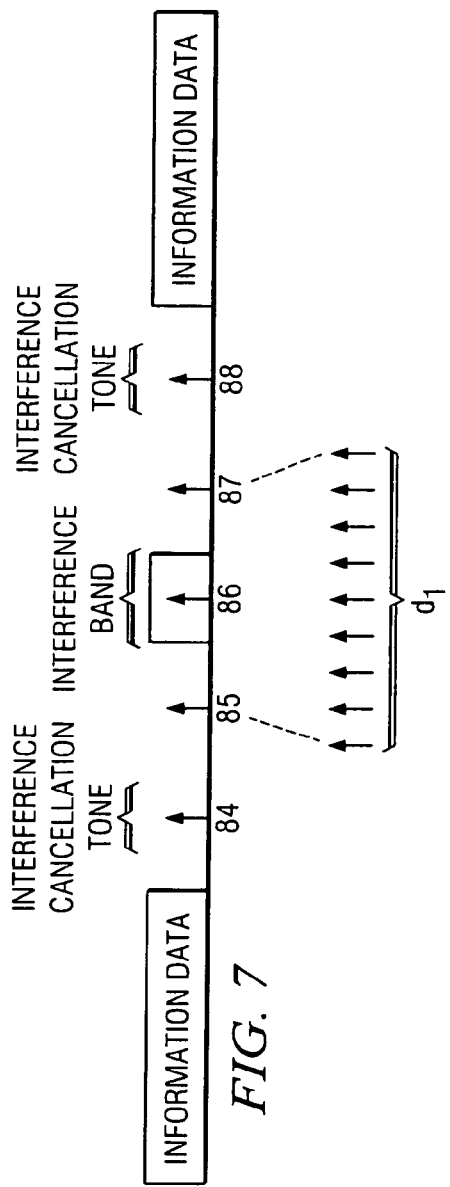
FIG. 7 is an illustration of a plurality of active interference cancellation tones according to an embodiment of the disclosure.

Turning now to FIG. 7, the relation between the tones used for the AIC and position of the interference band 412 is shown. In the following discussion, an exemplary interference band of 7 MHz width co-located with the OFDM tones 85, 86 and 87 is considered. The interference to this band caused by spurious signals from adjoining tones is evaluated at four-times finer frequencies indicated as the vector $d_1$. $d_1$ can be computed as the values of Y(l) where the index l corresponds to the four-times up-sampled frequency positions within the interference band 412 (in this example, l takes on values of 340 to 348) and the tones X(84) to X(88) are turned off. To achieve effective interference cancellation, while avoiding exceedingly large tone values, one tone is added to each side of these three tones, OFDM tones 84 and 88, and the five tones 84, 85, 86, 87, and 88 are employed to cancel interference. As discussed later, these two tones, 84 and 88, which may be referred to as protection-edge tones (PETs), contribute more to the interference suppression than the middle three tones. $d_1$ is given as $$d_1 = Pg \quad \text{Eq (7)}$$

where P is the frequency-conversion kernel defined by equation (6b) and g is the vector of the information data with X(84) to X(88) forced to zero. P is a 9×128 matrix, and g is a 128×1 vector. In general, P may be a s×v matrix and g is a v×1 vector. The v dimension is based on the number of tones of the OFDM symbol. The s dimension is based on the number of up-sampled values, which is in turn based on the width of the interference band 412.

The negative of the interference signal $d_1$ is calculated using the tones X(84) to X(88). Using the equation (6a) above, setting all the X, or tones, to zero except X(84) to X(88), the equation to solve is as follows:

$$P_1 h = -d_1 \quad \text{Eq (8)}$$

where h is the column vector of (X(84), ..., X(88)) and $P_1$ is the small kernel derived from P by limiting the index according to h and $d_1$. Thus, h is a 5×1 vector and $P_1$ is a 9×5 matrix. In general, h is a u×1 vector and $P_1$ is a s×u matrix. $P_1$ may be formed by selecting the u columns of P that correspond to the u AIC tones and PETs to be assigned values. The dimension u is based on the number of AIC tones and PETs to be determined.

The solution of equation (8) for h provides the desired AIC tone and PET values. equation (8) may be difficult to solve, because the matrix $P_1$ is not invertible ($P_1$ is not a square matrix). Hence, instead, the minimization of $$e^2 = \|P_1 h + d\|^2 \quad \text{Eq (9)}$$

can lead to a solution for h given as $$h = -(P_1^T P_1)^{-1} P_1^T d_1 = -W_1 d_1 \quad \text{Eq (10)}$$

where the superscript T stands for the conjugate transpose of the matrix and the superscript −1 stands for the inverse matrix. This minimum mean-squared solution may be referred to as the Moore-Penrose generalized inverse. The resultant 5×9 matrix $W_1$ in equation (10) can be pre-computed because the interference band location is known. In general $W_1$ is a u×s matrix. Combining equation 7 and equation 10 gives $$h = -W_1 Pg = -W_2 g \quad \text{Eq (11)}$$

where $W_2$ is a pre-computable 5×128 matrix. In general, $W_2$ is a u×v matrix.

The AIC tone and PET coefficients h are dependent on the information data vector g, but the AIC tone and PET coefficients have interesting characteristics. Some exemplary coefficients may be calculated to be as follows:

X(84)=−1.5384−1.6723j

X(85)−0.0278+0.0493j

X(86)=0.0004−0.0022j

X(87)=0.0064−0.0234j

X(88)=0.1855+1.7943j

Computing the power of the resulting AIC tones and PETs above, it is seen that the power of the X(84) and X(88) tones are, respectively, 5.12 (or 4.1 dB with respect to the data tone power of 2), and 3.23 (or 2.1 dB) times larger than the transmitted data tones. It can be shown that the maximum of the average overshoot power is actually 4.0 dB above the data tones. Because the UWB transmit power must not exceed the average power limit of −41.25 dBm/MHz at any frequency (between 3.1 and 10.6 GHz), the average transmit power of the data tones must be lowered by the amount of the overshoot (4.0 dB), and this decreases the UWB transmission distance by 37% (=10^(0.4/2)). This may be an excessive degradation of performance. It is possible to limit the overshoot in solving equation (10), but then the notch depth needs to be compromised; it is generally difficult to obtain the desired notch bandwidth and depth in the conventional AIC approach described above.

Figure 8:
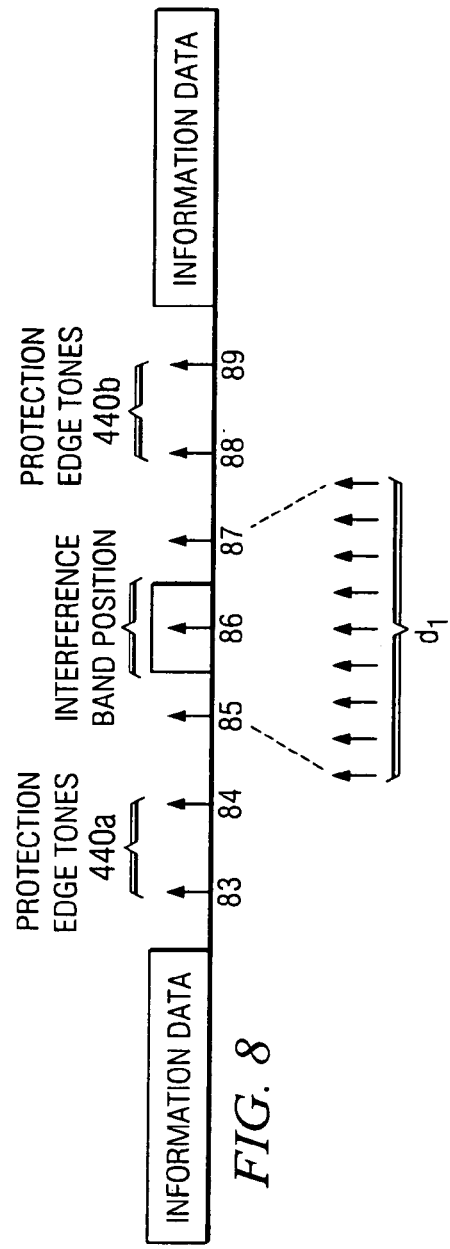
FIG. 8 is an illustration of a plurality of protection-edge tones and active interference cancellation tones according to an embodiment of the disclosure.

Turning now to FIG. 8, in order to find the power constrained AIC solution, which avoids the overshoot problem, four PETs 440 are defined and located as shown on both sides of the interference band 412. Note that the size of the vector h in equation (9) is larger. Increasing the size of the PETs 440 increases the notch depth; the notch depth is accurately controlled by the size of the PETs 440.

With the extended h in equation (9), the optimization equation is modified to incorporate a second condition:

$$\min_h (\|P_1 h + d_1\|^2 + \lambda \|h\|^2) \quad \text{Eq (12)}$$

Here, $\lambda$ is the Lagrange multiplier that combines the two separate conditions, the minimization of the first term and that of the second term. The first term is identical to equation (9). The second term limits the overshoot of the AIC tones and PETs, whereby the term used to describe this solution, the power constrained AIC solution.

The solution of equation (12) is given by $$h = -(P_1^T P_1 + \lambda I)^{-1} P^T d_1 \quad \text{Eq (13)}$$

where I is the identity matrix. The value of $\lambda$ is determined to set the maximum average power of the computed AIC tones and PETs 440 to 0 dB with respect to the data tones. Combining equation (7) and equation (13)

$$h = -(P_1^T P_1 + \lambda I)^{-1} P^T Pg = -W_3 g \quad \text{Eq (14)}$$

$W_3$ can be pre-calculated using well known methods of matrix mathematics when the interference band location and bandwidth are known. In an embodiment, a value of $\lambda$ in the range of from about 0 to about 3072 is employed. In an embodiment, a value of 2048 is employed for $\lambda$.

Table 1 summarizes the relationship between the PET size and the achievable notch depth for the interference bandwidth of 7 MHz. Table 2 summarizes the similar results for 20 MHz. The newly derived AIC tones do not manifest the objectionable overshooting phenomenon. Keeping this property, the notch depth can be arbitrarily determined by the size of the PET 40.

TABLE 1

Interference bandwidth of 7 MHz

| AIC Tones | PET size (tones) | Notch Depth |
|---|---|---|
| 6 | 2 | −45 dB |
| 8 | 3 | −71 dB |
| 10 | 4 | −84 dB |
| 12 | 5 | −115 dB |

TABLE 2

Interference bandwidth of 20 MHz.

| AIC Tones | PET size (tones) | Notch Depth |
|---|---|---|
| 9 | 2 | −32 dB |
| 11 | 3 | −48 dB |
| 13 | 4 | −54 dB |
| 15 | 5 | −64 dB |
| 17 | 6 | −77 dB |

Because $W_3$ is pre-calculable, there is no need to execute the computation to find $W_2$ in real time. The AIC tones at the interference band position are near zero. In an embodiment, the AIC tones in the interference band are set to zero and only the PETs 440 are calculated. Thus for the notch bandwidth of 7 MHz and the depth of 71 dB, the number of the computed AIC tones plus PETs 440 is six from Table 1. Using the pre-computed $W_2$ matrix coefficients, the first PET/2 number of rows and the last PET/2 number of rows correspond to the computed coefficients for the PETs 440 (the AIC tones at the interference band being set to zero, they need not be calculated).

Again, while exemplary OFDM symbol structures, number of AIC tones, number of PETs have been employed in the discussions above, the present disclosure contemplates working with other OFDM symbol structures, number of AIC tones, and number of PETs. It is readily apparent to one skilled in the art that the power constrained AIC solution described above is highly generalizable to other OFDM symbol structures and other interference bands 412. Note that the power constrained AIC solution can be superimposed to accommodate multiple interference bands.

In an embodiment, the use of AIC tones may be combined with window filtering to provide protection to victim frequencies and to reduce any associated power overshoot. In this case, the equations Eq (4), Eq (5), Eq (6a), and Eq (6b) may be modified, as will be readily appreciated by one skilled in the art, to accommodate the window filtering applied to the data tones and to the AIC-PET tones. For example, Eq (4), Eq (5), Eq (6a), and Eq (6b) may be modified to Eq (4'), Eq (5'), Eq (6a'), and Eq (6b') as described below. In the following analysis, the OFDM symbol of 128 tones is analyzed. One skilled in the art will readily appreciate, however, that the analysis and solutions discussed may be applied to other OFDM symbol structures. When the information data is represented as X(k) k=0, ..., 127, the transmitted OFDM signal is (without low-pass filter)

$$x(n) = \sum_{k=0}^{127} X(k)\exp\left(j2\pi\frac{nk}{128}\right) \quad \text{Eq (4')}$$

At this point, because Lp cyclic postfix and/or cyclic prefix samples may be appended to the 128 samples and the corresponding (four-time up-sampled) spectrum Y(l) (l=0, ... 4*128−1) is $$Y(l) = \frac{1}{128}\sum_{n=0}^{127+Lp} W(n)x(n)\exp\left(-j2\pi\frac{n}{128}\frac{l}{4}\right) \quad \text{Eq (5')}$$

Combining these two equations, the relation between X and Y may be represented $$Y(l) = \frac{1}{128}\sum_{n=0}^{127+Lp} W(n)\left(\sum_{k=0}^{127} X(k)\exp\left(j2\pi\frac{n}{128}\left(k-\frac{l}{4}\right)\right)\right) \quad \text{Eq (6a')}$$

$$= \frac{1}{128}\sum_{k=0}^{127} X(k)P(l,k)$$

$$P(l,k) = \sum_{n=0}^{127+Lp} W(n)e^{j2\pi n(k-l/4)/128} \quad \text{Eq (6b')}$$

where P(l,k) is the kernel of the transform.

Turning now to FIG. 9, a circuit 500 for determining the AIC tones and PETs a through z based on the matrix $W_3$ is depicted. The circuit 500 comprises an AIC stage 502 for each of the AIC tones and PETs to be calculated, for example stages 502a through 502z. Each AIC stage comprises a memory area 504, a multiplier 506, an accumulator register 508, an adder 510, and a quantizer 512. Each AIC stage 502 determines an AIC tone or PET based on the input vector g, with the AIC tones and PETs set to zero, and on the values from the appropriate row of $W_3$ stored in the memory area 504. In an exemplary embodiment, the OFDM symbol contains 128 tones, and the circuit 502 performs the matrix multiplication of the 1×128 vector stored in the memory area 504 by the 128×1 input vector g. The quantizer scales the values of the AIC tones and PETs 440. The circuit 500 may be referred to as an interference cancellation component or a PET-AIC component.

Turning now to FIG. 10, a transmitter 540 that includes the circuit 500 described above is depicted. Excepting the circuit 500, the transmitter 540 may be substantially similar to the transmitter 200 described above. Additionally, the transmitter 540 is compatible with combining with the transceiver 360 described above. The transmitter includes a data scrambler 550, a convolutional encoder 552, a puncturing component 554, an interleaver 556, a data mapper 558, the circuit 500, and an inverse fast Fourier transformer 560. The source information data is scrambled by the data scrambler 550 and channel encoded (convolutional encoding is a typical example) by the convolutional encoder 552. The data is punctured to match the data to the transmitted symbol rate by the puncturing component 554. The data is then interleaved to improved the error resiliency by the interleaver 556 and mapped to each OFDM tone by the data mapper 558. The tones in the interference band are turned off (zeroed). The circuit 500 reads the mapped data tone values and computes the PET-AIC tones and replaces the turned-off tones. All the tones are transformed from the frequency domain to the time domain by the inverse fast Fourier transformer 560. The time domain signal is DA converted and transmitted after it is up-converted to RF by other transmitter component (not shown). The transmitted OFDM signal has the desired notch at the specified band position. In an embodiment, the transmitter 540 is combined with a receiver stage as a transceiver.

While several embodiments have been provided in the present disclosure, it should be understood that the disclosed systems and methods may be embodied in many other specific forms without departing from the spirit or scope of the present disclosure. While the Japanese radio astronomy frequency bands have been used as exemplary victim frequency bands that the several embodiments of the disclosure may protect, the disclosed methods, systems, and circuits may be applied to protect other victim frequency bands now known or yet to be licensed. One or more embodiments may be directed to avoiding interference with receivers and/or transceivers in a satellite band, a WiMax band, a fixed wireless access band, a fixed services band, and/or a fourth generation wireless band. One or more embodiments may be directed to avoiding interference with receivers operating in an unlicensed band, for example IEEE-802.11 a receivers or transceivers. Additionally, the basic operation of the disclosed methods, systems, and circuits may be applicable beyond the exemplary MB-OFDM spectrum, and these additional applications are also contemplated by the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method of wirelessly communicating, comprising:
   generating a plurality of tones for a wideband orthogonal frequency division multiplex symbol, the tones including a plurality of contiguous zero-valued tones;
   inverse Fourier transforming the tones to a plurality of time-domain samples;
   copying a number of the time-domain samples as a portion of a cyclic block, the cyclic block contiguous with the time-domain samples;
   time-domain window filtering the time-domain samples and the cyclic block to form a portion of the wideband orthogonal frequency division multiplex symbol, wherein the time-domain window filter is a function $\Phi(k)$ having the property that $\Phi(k)+\Phi(k+N_{\mathit{fft}})$ is in approximate equality with a constant $\theta$ where $N_{\mathit{fft}}$ is the number of tones; and
   transmitting the wideband orthogonal frequency division multiplex symbol.

2. The method of claim 1, wherein the contiguous zero-valued tones are associated with a victim frequency band.

3. The method of claim 1, wherein the windowing function $\Phi(k)$ is a raised-cosine function defined as:

$$\Phi(k) = \frac{1}{2}\left[1 + \cos\left(\frac{\pi(2L_p - 2k - 1)}{2L_p}\right)\right] \quad \text{for } k = 0, \ldots, L_p - 1$$

$$\Phi(k) = 1 \quad \text{for } k = L_p, \ldots, N_{\mathit{fft}} - 1$$

$$\Phi(k) = \frac{1}{2}\left[1 + \cos\left(\frac{\pi(2k - 2N_{\mathit{fft}} + 1)}{2L_p}\right)\right] \quad \text{for } k = N_{\mathit{fft}}, \ldots, N_{\mathit{fft}} + L_p - 1$$

$$\Phi(k) = 0 \quad \text{for } k < 0 \text{ and } k > N_{\mathit{fft}} + L_p - 1$$

where $L_p$ is the number of time-domain samples that are copied as the portion of the cyclic block.

4. The method of claim 1, wherein the windowing function $\Phi(k)$ is a trapezoidal function defined as:

$$\Phi(k) = \frac{2k+1}{2L_p} \quad \text{for } k = 0, \ldots, L_p - 1$$

$$\Phi(k) = 1 \quad \text{for } k = L_p, \ldots, N_{\mathit{fft}} - 1$$

$$\Phi(k) = \frac{2N_{\mathit{fft}} + 2L_p - 2k - 1}{2L_p} \quad \text{for } k = N_{\mathit{fft}}, \ldots, N_{\mathit{fft}} + L_p - 1$$

$$\Phi(k) = 0 \quad \text{for } k < 0 \text{ and } K > N_{\mathit{fft}} + L_p - 1$$

where $L_p$ is the number of time-domain samples that are copied as the portion of the cyclic block.

5. The method of claim 1, wherein the number of time-domain samples copied as the portion of the cyclic block is in the range from 1 to the length of a cyclic prefix.

6. The method of claim 5, wherein the number of time-domain samples copied as a portion of the cyclic block is 16.

7. The method of claim 1, wherein the number of time-domain samples copied as the portion of the cyclic block is in the range from 1 to half the length of a cyclic prefix.

8. The method of claim 1, wherein the generating includes multiplying the tones by a linear phase as a function of $L_p$, where $L_p$ is the number of time-domain samples that are copied as the portion of the cyclic block.

9. The method of claim 8, wherein the tones are represented by $X(k)$ and the linearly phase compensated tones are represented by $X_{cyc}(k)$ where $$X_{cyc}(k) = X(k)\exp\left(\frac{j2\pi k L_p}{N_{\mathit{fft}}}\right)$$

10. The method of claim 1, wherein the time-domain window filtering is selected from the group consisting of one of every three orthogonal frequency division multiplex symbols, two of every three orthogonal frequency division multiplex symbols, three of every three orthogonal frequency division multiplex symbols, one of every two orthogonal frequency division multiplex symbols, two of every two orthogonal frequency division multiplex symbols, and one of every one orthogonal frequency division multiplex symbols, two of every six orthogonal frequency division multiplex symbols, four of every six orthogonal frequency division multiplex symbols, and two of every four orthogonal frequency division multiplex symbols.

11. The method of claim 1, wherein a first portion of the wideband orthogonal frequency division multiplex symbols use time-domain window filtering and a second portion of the wideband orthogonal frequency division multiplex symbols use no time-domain window filtering, wherein the second portion is the complement of the first portion.

12. The method of claim 1, wherein during a first duration the time-domain window filtering is applied to the multiband orthogonal frequency division multiplex symbols and during a second duration no time-domain windowing is applied to the multiband orthogonal frequency division multiplex symbols.

13. The method of claim 1, wherein the time-domain window filtering is employed to form a wideband orthogonal frequency division multiplex symbol of a stream of wideband orthogonal frequency division multiplex symbols.

14. A transmitter, comprising:
an inverse Fourier transformer operable to transform a frequency domain signal comprising a plurality of tones to a time-domain signal, the tones comprising in part a plurality of contiguous zero-valued tones; and
a windowing filter operable to filter the time-domain signal based on a windowing function, wherein the windowing function, represented by $\Phi(k)$, has the property that $\Phi(k)+\Phi(k+N_{\mathit{fft}})$ is in approximate equality with a constant $\theta$ where $N_{\mathit{fft}}$ is the number of tones, and wherein an output of the windowing filter comprises part of a multiband orthogonal frequency division multiplex symbol that is transmitted by the transmitter.

15. The transmitter of claim 14, wherein the windowing function $\Phi(k)$ is a raised-cosine function defined as:

$$\Phi(k) = \frac{1}{2}\left[1 + \cos\left(\frac{\pi(2L_p - 2k - 1)}{2L_p}\right)\right] \quad \text{for } k = 0, \ldots, L_p - 1$$

$$\Phi(k) = 1 \quad \text{for } k = L_p, \ldots, N_{\mathit{fft}} - 1$$

$$\Phi(k) = \frac{1}{2}\left[1 + \cos\left(\frac{\pi(2k - 2N_{\mathit{fft}} + 1)}{2L_p}\right)\right] \quad \text{for } k = N_{\mathit{fft}}, \ldots, N_{\mathit{fft}} + L_p - 1$$

$$\Phi(k) = 0 \quad \text{for } k < 0 \text{ and } k > N_{\mathit{fft}} + L_p - 1$$

where $L_p$ is the number of time-domain samples that are copied as the portion of the cyclic block.

16. The transmitter of claim 14, wherein the windowing function $\Phi(k)$ is a trapezoidal function defined as:

$$\Phi(k) = \frac{2k+1}{2L_p} \quad \text{for } k = 0, \ldots, L_p - 1$$

$$\Phi(k) = 1 \quad \text{for } k = L_p, \ldots, N_{\mathit{fft}} - 1$$

$$\Phi(k) = \frac{2N + 2L_p - 2k - 1}{2L_p} \quad \text{for } k = N_{\mathit{fft}}, \ldots, N_{\mathit{fft}} + L_p - 1$$

$$\Phi(k) = 0 \quad \text{for } k < 0 \text{ and } K > N_{\mathit{fft}} + L_p - 1$$

where $L_p$ is the number of time-domain samples that are copied as the portion of the cyclic block.

17. The transmitter of claim 14, wherein the plurality of contiguous zero-valued tones are selected to protect one or more victim frequency bands.

18. The transmitter of claim 17, wherein the victim frequency bands are selected from the group consisting of a Japanese radio astronomy band, a satellite band, a WiMax band, a fixed wireless access band, a fixed services band, and a fourth generation wireless band.

19. The transmitter of claim 17, further including:
an interference cancellation component comprising a plurality of cancellation tone generators, each cancellation tone generator comprising:
a tone optimization array storing v values, where v is equal to the number of orthogonal frequency division multiplex tones and where the v values are determined based on optimizing active interference cancellation, and further based on constraining average power of a plurality of active interference cancellation values and a plurality of protection-edge values to less than or equal to a maximum power level, and on a plurality of data values;
a multiplier operable to multiply one of the v values by an associated data value; and
an accumulation register operable to accumulate a product output by the multiplier;
wherein the interference cancellation component comprises a number u cancellation tone generators, the number u based on a number of a plurality of active interference cancellation tones and a plurality of protection-edge tones forming part of an orthogonal frequency division multiplex signal, wherein the cancellation tone generators each determine one of an active interference cancellation value to be assigned to one of the active interference cancellation tones and a protection-edge value to be assigned to one of the protection-edge tones, and where the u tone optimization arrays contain values that may be represented as a u x v matix W, where W is determined as $$W = (P_1^T P_1)^{-1} P_1^T P$$

where P is a s x v matrix where element $P_{a,b}$ in row a and column b of P is determined as $$P_{a,b} = \sum_{n=0}^{v-1} \Phi(n) e^{j2\pi n (k - l/4)/v}$$

where k=b−1 and l=a−1 +offset, where the offset is based on an interference bandwidth and an interference center frequency, where $P_1$ is a s x u matrix composed of u adjacent columns selected from P based on the interference center frequency, where $P_1^T$ is the transpose matrix of $P_1$, and where the negative exponent associated with the parentheses indicates matrix inversion.

20. A transceiver, comprising:
a multiplex serial-to-parallel converter operable in a transmit mode to convert a $N_{\mathit{fft}}$ length sequence of bits into $N_{\mathit{fft}}$ parallel bits before transmitting as part of a multiband orthogonal frequency division multiplex symbol, the multiplex serial-to-parallel converter further operable in a receive mode to convert a $N_{\mathit{fft}}$ length sequence of data of at least part of an multiband orthogonal frequency division multiplex symbol into $N_{\mathit{fft}}$ parallel samples;
a Fourier transformer operable in the transmit mode to inverse Fourier transform the $N_{\mathit{fft}}$ parallel bits in the frequency domain to $N_{\mathit{fft}}$ samples in the time domain, the Fourier transformer further operable in the receive mode to Fourier transform the $N_{\mathit{fft}}$ parallel samples in the time domain to $N_{\mathit{fft}}$ parallel bits in the frequency domain; and
a windowing component operable in the transmit mode to process the $N_{\mathit{fft}}$ samples in the time domain using a windowing function, the windowing component further operable in the receive mode to process the $N_{fft}$ parallel bits in the frequency domain to provide fine frequency offset adjustment of the $N_{fft}$ parallel bits based on one or more pilot tones included among the $N_{fft}$ parallel bits in the frequency domain.

21. The transceiver of claim 20, further including a cyclic extension component operable in the transmit mode to copy a portion of the $N_{fft}$ samples in the time domain and to provide N time domain samples including the $N_{fft}$ samples and the copied samples.

22. The transceiver of claim 20, further including a multiplexer component operable to provide at least $N_{fft}$ coefficients to the windowing component, the at least $N_{fft}$ coefficients selected from a plurality of windowing coefficients in the transmit mode and from a plurality of fine frequency offset correction values in the receive mode.

23. The transceiver of claim 22, wherein the multiplexer component is further operable in the transmit mode to select the $N_{fft}$ coefficients from a plurality of coefficients based on an time frequency code input.

24. The transceiver of claim 20 wherein the windowing function is a raised-cosine function $\Phi(k)$ defined as:

$$\Phi(k) = \frac{1}{2}\left[1 + \cos\left(\frac{\pi(2L_p - 2k - 1)}{2L_p}\right)\right] \quad \text{for } k = 0, \ldots, L_p - 1$$

$$\Phi(k) = 1 \quad \text{for } k = L_p, \ldots, N_{fft} - 1$$

-continued $$\Phi(k) = \frac{1}{2}\left[1 + \cos\left(\frac{\pi(2k - 2N_{fft} + 1)}{2L_p}\right)\right] \quad \text{for } k = N_{fft}, \ldots, N_{fft} + L_p - 1$$

$$\Phi(k) = 0 \quad \text{for } k < 0 \text{ and } k > N_{fft} + L_p - 1$$

where $L_p$ is a number of time-domain samples that are copied as the portion of a cyclic block associated with the $N_{fft}$ tones.

25. The transceiver of claim 20, wherein the windowing function is a trapezoidal function $\Phi(k)$ defined as:

$$\Phi(k) = \frac{2k + 1}{2L_p} \quad \text{for } k = 0, \ldots, L_p - 1$$

$$\Phi(k) = 1 \quad \text{for } k = L_p, \ldots, N_{fft} - 1$$

$$\Phi(k) = \frac{2N_{fft} + 2L_p - 2k - 1}{2L_p} \quad \text{for } k = N_{fft}, \ldots, N_{fft} + L_p - 1$$

$$\Phi(k) = 0 \quad \text{for } k < 0 \text{ and } K > N_{fft} + L_p - 1$$

where $L_p$ is the number of time-domain samples that are copied as a portion of a cyclic block associated with the $N_{fft}$ tones.

* * * * *